Feb. 22, 1944.  C. E. SWENSON  2,342,227
COMBINED CLUTCH AND BEARING
Filed March 8, 1943
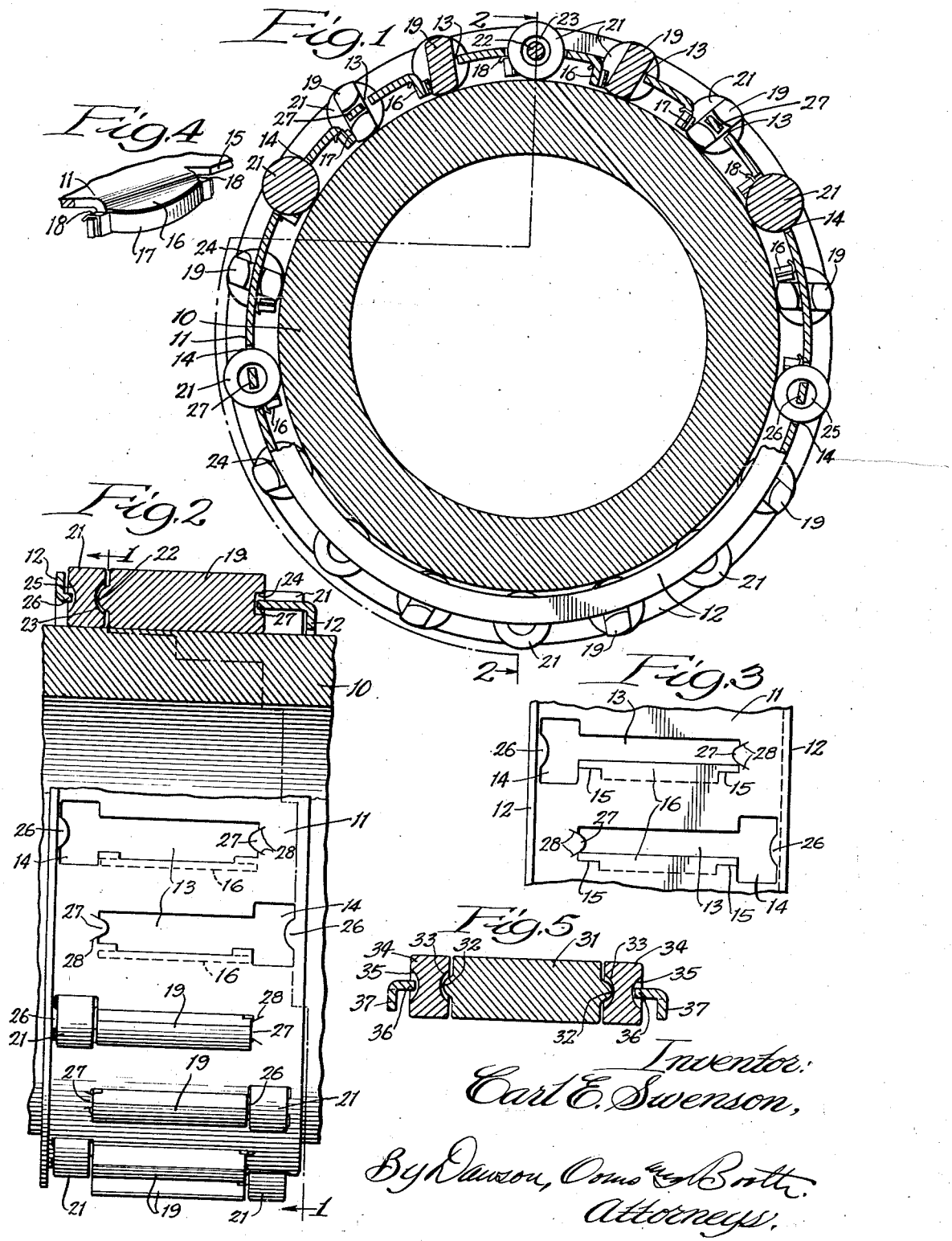
Inventor:
Carl E. Swenson,
By Dawson, Ooms & Botti
Attorneys.

Patented Feb. 22, 1944

2,342,227

UNITED STATES PATENT OFFICE 2,342,227

COMBINED CLUTCH AND BEARING

Carl E. Swenson, Rockford, Ill.

Application March 8, 1943, Serial No. 478,384

4 Claims. (Cl. 192—45.1)

This invention relates to a combined clutch and bearing and more particularly to the mounting of the gripper and bearing members in a unit of this type.

One of the objects of the present invention is to provide a combined clutch and bearing in which the bearing and gripper members are assembled in a cage and are held in place therein in a simple manner involving a minimum number of parts and of assembly operations.

Another object of the invention is to provide a combined clutch and bearing in which the bearing and gripper members engage and assist in supporting each other. This construction not only simplifies the mounting of the members in an assembled unit but also provides a unit of maximum capacity for a given size by reducing the amount of supporting structure required for each member.

The above and other objects and advantages of the invention will be more readily apparent from the following description when read in connection with the accompanying drawing, in which—

Figure 1 is a section on the broken line 1—1 of Figure 2 of a combined clutch and bearing embodying the invention;

Figure 2 is a view on the line 2—2 of Figure 1;

Figure 3 is a partially developed view of the cage;

Figure 4 is a partial perspective view showing the spring mounting; and

Figure 5 is a partial radial section illustrating an alternative construction.

The unit illustrated is adapted to connect an inner race 10 with an outer cylindrical race not shown, for free relative rotation in one direction and for engagement to prevent relative rotation in the opposite direction. The unit comprises an annular cage 11 formed of sheet metal or like sheet material bent into an annulus and having stiffening flanges 12 at its opposite edges. The ring 11 is formed throughout its circumference with a series of axially extending openings having narrow portions 13 in the central part of the ring and enlarged portions 14 of greater width than the portions 13 adjacent the edges of the ring. The enlarged portions are arranged on the opposite ends of alternate openings to provide a staggered mounting for bearing rollers as will appear hereinafter.

The narrow portions 13 of the openings are formed as shown in Figure 3, by punching out a portion of the sheet and at the same time cutting annular slits 15 to leave flaps 16 connected to the sheet in their central portions and separated therefrom at their ends. The flaps 16 are then bent in at abrupt angles to the sheet to form flanges as shown in Figure 1.

Springs 17 are adapted to be carried by the flanges and are formed of curved leaf spring material having hook portions 18 at the opposite ends to hook over the ends of the flanges 16. In this way, the springs are connected to the flanges to be carried thereby.

Grippers 19 are mounted in the openings 13 in the ring and as shown, are formed by elongated pieces having flat parallel sides connected by arcuate ends curved about spaced centers. The grippers are of such length that they will substantially fill the openings 13 and will terminate flush with the inner edges of the wider openings 14. Bearing rollers 21 are mounted in the openings 14 and are of such a size that they will substantially fill the openings.

In order to support the bearings and grippers in the ring or cage, the adjacent ends thereof are formed with interfitting parts shown as comprising projections 22 on the ends of the grippers which fit into central depressions 23 in the ends of the bearings. The depressions and projections are so proportioned that the adjacent edges of the bearings and grippers will be slightly spaced but will engage to limit relative misalinement upon a slight tilting movement of the parts. The outer ends of the grippers are formed with central depressions 24 in the form of slots extending across the gripper ends and having curved edges and the outer ends of the bearings are formed with axial depressions 25 similar to the depressions 23. The cage is formed with integral fingers 26 and 27 fitting into the depressions 25 and 24 respectively to hold the bearings and grippers in place in the cage.

In order that the parts may be assembled the ring 11 is split as indicated at 28 adjacent the tongue 27 so that this tongue can be bent out of the ring to permit assembly of the bearings and grippers therein and can then be bent back to its original position to fit into the depressions 24. When the parts are assembled in this manner, the bearing rollers and grippers will be held assembled in the cage so that it can be handled as a single unit during installation and will be sufficiently free to operate between the races in the intended manner.

Figure 5 illustrates an alternative construction which may be employed where great bearing capacity is required and which includes a gripper 31 having projections 32 at its ends fitting into depressions 33 in bearing rollers 34. The bearing rollers have depressions 35 in their outer ends to receive tongues 36 formed on a cage or ring 37. This construction is substantially the same as that of Figures 1 to 4, except that two bearing rollers are provided for each gripper to increase the bearing capacity of the unit.

While two embodiments of the invention have been shown and described, it will be understood that these are illustrative only and are not to be taken as a definition of the scope of the invention, reference being had for this purpose to the appended claims.

What is claimed is:

1. A combined clutch and bearing comprising an annular ring of sheet material formed in its periphery with axially elongated openings having portions of reduced width and adjacent wider portions, gripper members mounted in the portions of reduced width, bearing members mounted in the wider portions, interfitting parts on the adjacent ends of the gripper and bearing members whereby they mutually support each other, the outer ends of the members being formed with central depressions, and integral tongues on the ring extending into the depressions to support the members in the ring.

2. A combined clutch and bearing comprising an annular ring of sheet material formed in its periphery with axially elongated openings which are relatively narrow throughout a portion of their length and have wider portions at one end, the wider portions being at opposite ends of alternate openings around the ring, grippers mounted in the narrow portions, bearing rollers mounted in the wider portions, the adjacent ends of the grippers and rollers being formed with interfitting projections and depressions respectively whereby they mutually support each other, the outer ends of the grippers and rollers being formed with depressions, and tongues on the ring fitting into the last named depressions to support the grippers and rollers in the ring.

3. A combined clutch and bearing comprising an annular ring of sheet material formed in its periphery with axially elongated openings having central relatively narrow portions and wider portions at each end, grippers mounted in the narrow portions, bearing rollers mounted in each of the wider portions, the adjacent ends of the grippers and bearings being formed with interfitting projections and depressions respectively whereby they mutually support each other, the outer ends of the bearings being formed with depressions, and tongues on the ring extending into the last named depressions.

4. A combined clutch and gearing comprising an annular cage having axially extending openings therein, alined gripper and bearing members mounted in each of the openings, the adjacent ends of said members being formed with interfitting projections and depressions respectively whereby they mutually support each other and the outermost ends being formed with depressions, and projections on the cage extending into the last named depressions to support the members in the cage.

CARL E. SWENSON.